United States Patent [19]

LeBisch et al.

[11] Patent Number: 4,871,502
[45] Date of Patent: Oct. 3, 1989

[54] METHOD FOR MANUFACTURING AN OTOPLASTIC

[75] Inventors: Helmut LeBisch; Rainer Basel, both of Erlangen; Georg Fuchs, Hemhofen; Hermann Dietmar, Scheinfeld; Ernst Wipfelder, Munich; Wilhelm Hekele, Kolbermoor, all of Fed. Rep. of Germany

[73] Assignee: Siemens Aktiengesellschaft, Munich, Fed. Rep. of Germany

[21] Appl. No.: 185,794

[22] Filed: Apr. 22, 1988

[30] Foreign Application Priority Data

May 6, 1987 [DE] Fed. Rep. of Germany ....... 3715082

[51] Int. Cl.[4] ............................................. B29C 33/40
[52] U.S. Cl. .................................... 264/222; 181/129; 264/225; 264/DIG. 30; 264/261; 425/2
[58] Field of Search ................. 181/130, 135, 22, 129; 425/2; 264/222, 225, 220, 261, 262, 263, 267, DIG. 30

[56] References Cited

U.S. PATENT DOCUMENTS

| 3,602,654 | 0/0000 | Victoreen | 181/135 |
| 4,663,102 | 5/1987 | Brenman et al. | 264/DIG. 30 |
| 4,712,245 | 12/1987 | Lyregaard | 264/222 |
| 4,716,985 | 1/1988 | Haertl | 181/130 |
| 4,800,636 | 1/1989 | Topholm | 264/222 |

FOREIGN PATENT DOCUMENTS

| 1231304 | 12/1966 | Fed. Rep. of Germany . |
| 2459259 | 4/1979 | Fed. Rep. of Germany . |
| 3206402 | 9/1983 | Fed. Rep. of Germany . |
| 1552471 | 1/1969 | France . |
| 2084072 | 4/1982 | United Kingdom . |

OTHER PUBLICATIONS

"A Tool for the Optimization of Hearing Aid Fittings" by Voroba, in Hearing Aid Instruments, vol. 35, No. 1, 1984.

Primary Examiner—Jan H. Silbaugh
Assistant Examiner—Mathieu Vargot
Attorney, Agent, or Firm—Hill, Van Santen, Steadman & Simpson

[57] ABSTRACT

A method and apparatus for manufacturing an otoplastic. An otoplastic is manufactured directly in the ear of a hearing-impaired person in that a deformable envelope is pulled over a die or over a shell or over an overlayed over-shell. This apparatus is then supplied with flowing otoplastic material between the die and the envelope, being supplied therewith in the ear. The envelope expands and assumes the shape of the auditory canal. After hardening or curing of the otoplastic material in the ear of the hearing-impaired person, the envelope and the die are removed and a module of either an in-the-ear or of a behind-the-ear hearing aid is integrated therewith.

11 Claims, 4 Drawing Sheets

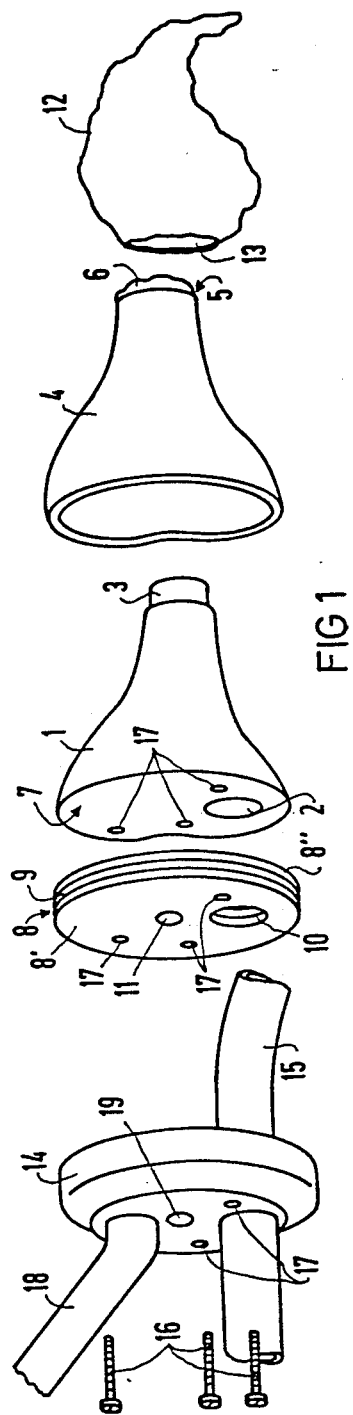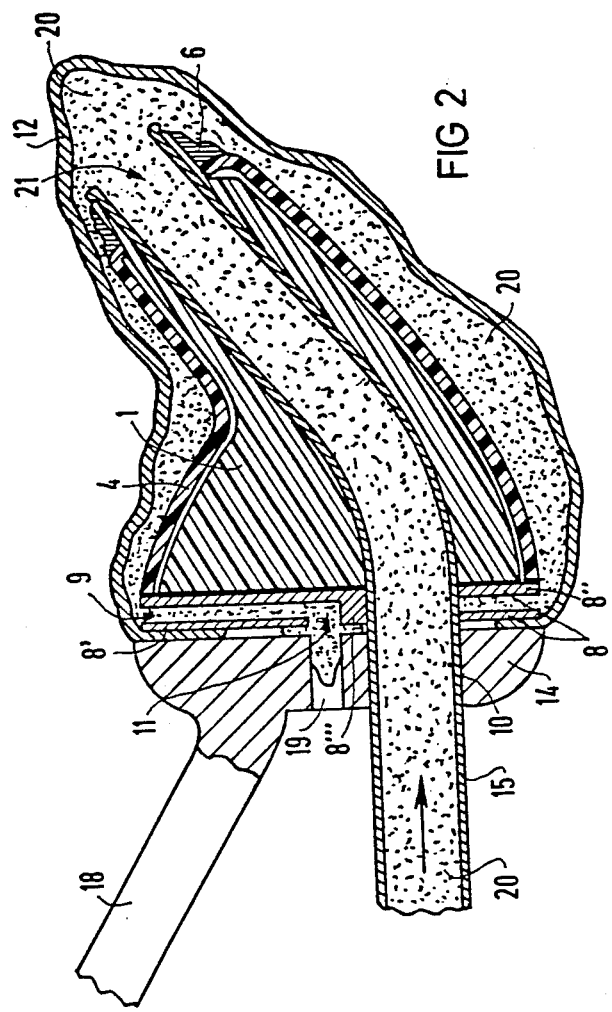

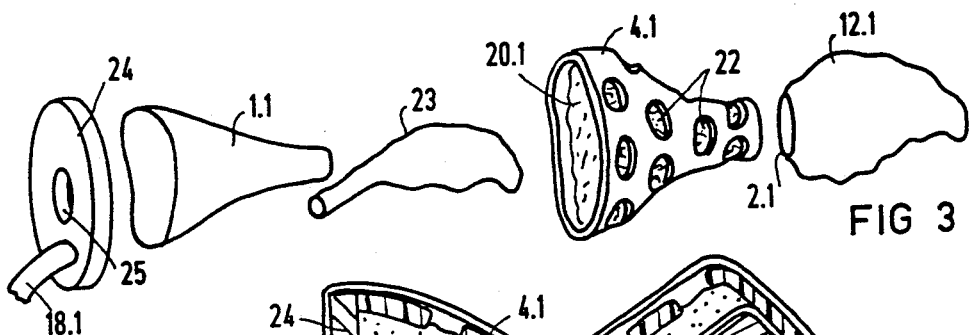
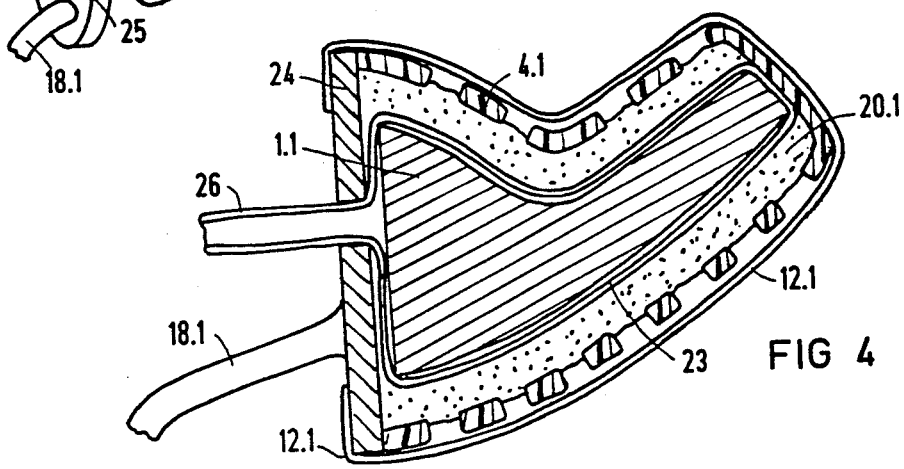
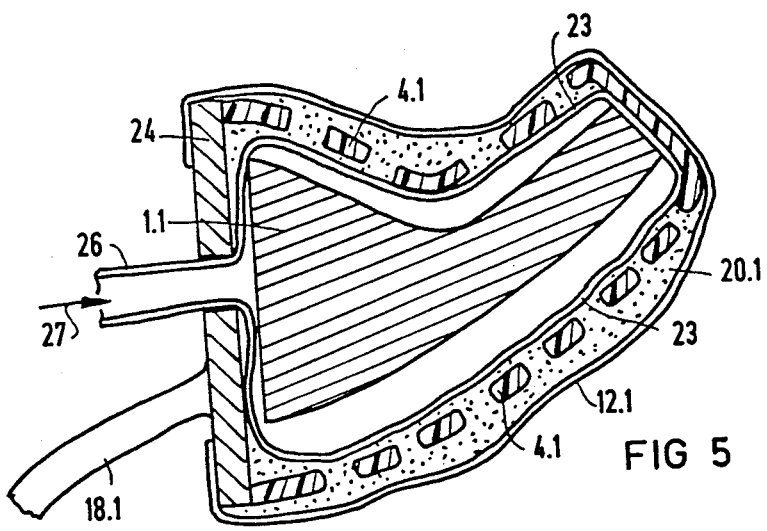

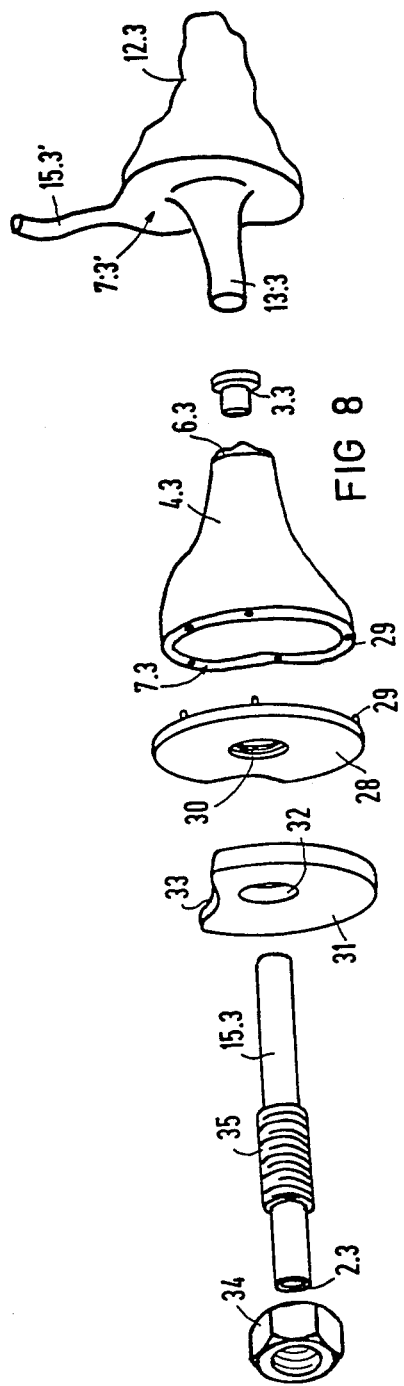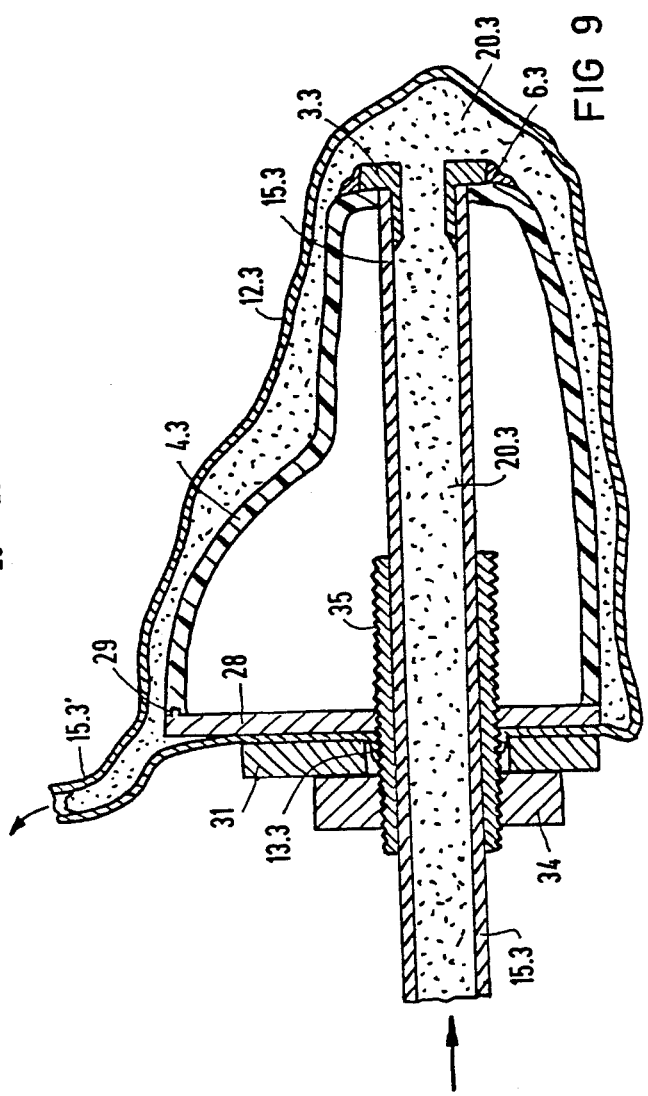

METHOD FOR MANUFACTURING AN OTOPLASTIC

BACKGROUND OF THE INVENTION

The present invention is directed to a method for manufacturing an otoplastic and to an apparatus for the implementation of the method.

In standard manufacturing methods for producing otoplastics, an impression is first made of the auditory canal of the ear of a hearing-impaired person to be supplied therewith. A negative is then shaped from the impression. Only then can an otoplastic be manufactured that fits the shape of the auditory canal of the ear. Under certain conditions, the otoplastic must still be cut or ground after manufacture in order to eliminate casting errors. Since this procedure is expensive and time-consuming, manufacturers have attempted for some time to develop a method with which the manufacture of an impression and of a negative can be avoided.

Thus, for example, German published application 12 31 304 discloses a method in which a self-hardening plastic is coated on a base member simulating the basic shape of the auditory canal of the human ear and in which the coated base member is subsequently directly inserted into the auditory canal of the ear of the hearing-impaired person. The plastic adapts to the inside contour of the auditory canal and the coated base member remains in the auditory canal until the plastic hardens.

This method, however, involves several disadvantages. First, it is relatively dangerous for the hearing-impaired person to have a paste-like compound directly in his ear since a part of the compound can detach from the base member and be pressed too far into the auditory canal. Second, the hardening or curing process of the plastic produces heat that can be unpleasant for the unprotected ear. Further, this publication discloses an embodiment wherein the plastic chemically unites with the base member, this being again dangerous for the unprotected ear. Finally, a plurality of standard base members is required in this method, since the plastic coating is not adequate to sufficiently adapt to the many different shapes of auditory canals.

The article "A Tool for the Optimization of Hearing Aid Fittings" by Dr. Barry Voroba published in "Hearing Instruments", volume 35, No. 1, January 1984, pages 12 through 14 and 16, and United Kingdom application GB-A 2 084 072 likewise disclose methods in which a plastic is directly placed into the auditory canal of the ear. In these methods, soft plastic materials or compounds are injected into the ear. Suitable dies are then pressed into the compound before it hardens or cures. After hardening the compound and die are removed from the auditory canal of the ear. The dies are subsequently removed from the compounds and housing shells remain for in-the-ear hearing aids. These methods, however, likewise exhibit most of the disadvantageous of the afore-mentioned German published application 12 31 304. For example, the soft compound is also in direct contact with the auditory canal of the ear and the hardening process occurs in the unprotected auditory canal. Moreover, a plurality of standard base members are again required, this resulting in costs and materials.

German application AS 24 59 259 discloses a further possibility of manufacturing an ear adaptor member without the use of an impression or negative. Instead of an otoplastic, the sound channel of the hearing aid is held in the auditory canal with a surrounding pocket filled with liquid. The pocket adapts to the shape of the auditory canal due to a pressure ring which is pressed against the pocket. A disadvantage of this method is that the liquid in the pocket does not harden. Therefore, there is always the risk that the pocket will rip and the fluid will run out. A similar apparatus that has a fluid-filled pocket is disclosed in U.S. Pat. No. 3,602,654.

French Pat. No. A 1 552 471 discloses a bag filled with hardenable molding material that is used as an otoplastic after the hardening of the molding material. The subject matter disclosed therein differs from the present invention in that the in-the-ear hearing aid module is plugged into the hardened otoplastic and therefore projects from the ear after the hearing aid is positioned in the ear. A hearing aid constructed according to the present invention is embedded in the otoplastic and overcomes this disadvantage.

Furthermore, since the bag has a constant volume, it cannot be as well-adapted to a variety of shapes of auditory canals. Since, in contrast to the present manufacturing method, no axial pressure is exerted on the walls of the auditory canal in the adaptation, the bag does not reproduce the shape of the auditory canal as well as the present invention. In order to produce an adequate hold in the ear, the otoplastic of French patent A 1 552 471 is not only seated in the auditory canal but is also seated in the auricle of the outer ear. The subject matter of French patent 1 552 471 (equivalent to German published application 1 616 152) is summarized in the article "Verfahren zum Herstellen eines Ohrstueckes fuer ein Hoergeraet" in Neues aus der Technik, No. 2, May 15, 1986, page 2, Wuerzburg, Federal Republic of Germany.

SUMMARY OF THE INVENTION

An object of the present invention is to provide a method and an apparatus for in-the-ear manufacture of an otoplastic without an impression and negative that also avoids the disadvantages of the above-described prior art methods and apparatus. A further object of the present invention is to provide a simplified method for in-the-ear manufacture of an otoplastic using mass-produced, pre-fabricated parts that can also be implemented by relatively unskilled persons.

The object of the present invention is achieved with a method and an apparatus for the implementation of the method as follows. An otoplastic is manufactured directly in the ear of the hearing-impaired person in that a deformable envelope is pulled over a die or over a shell and potentially over an overlayed over-shell and this apparatus is then supplied with flowing otoplastic material between the die and the envelope, being supplied therewith in the ear. The envelope expands and assumes the shape of the auditory canal. After hardening or curing of the otoplastic material in the ear of the hearing-impaired person, the envelope and potentially the die are removed and a module of either an in-the-ear or of a behind-the-ear hearing aid is integrated therein.

Due to the use of an envelope that is stretched over a die or over a shell and into which the liquid otoplastic material is introduced, the inner ear of the patient does not come into contact with the otoplastic material. The auditory canal is therefore protected against the development of heat and against chemical reactions as well as against the otoplastic compound itself. Given the advantageous use of an envelope which is easily stretchable, otoplastics can be manufactured that readily adapt to the many different shapes of auditory canals despite the use of only one standard type of base member. Since an otoplastic material that hardens or cures in a few minutes is introduced into the envelope, there is likewise no risk that the ear will be injured by a liquid material.

The method of the invention is suitable both for in-the-ear devices as well as for behind-the-ear hearing aids.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several figures of which like reference numerals identify like elements and in which:

FIG. 1 is an exploded perspective view of a die holder, an aeration plate, a die, an over-shell and an envelope that are utilized after assembly for the manufacture of an otoplastic according to the present invention;

FIG. 2 is a cross-sectional longitudinal view of the component parts of the FIG. 1 device in their assembled condition, and having introduced otoplastic material;

FIG. 3 is a exploded perspective view of an alternative apparatus for the manufacture of an otoplastic of the invention using an over-shell fashioned with holes and a second envelope;

FIGS. 4 and 5 are cross-sectional longitudinal views of the components of the FIG. 3 device in their assembled condition and having otoplastic material;

FIG. 8 is an exploded perspective view of a structure of a fourth apparatus of the present invention for the manufacture of an otoplastic, and FIG. 9 is a cross-sectional longitudinal view of the component parts of the FIG. 8 device in their assembled condition and having introduced otoplastic material.

DESCRIPTION OF THE PREFERRED EMBODIMENT

Figure 6:
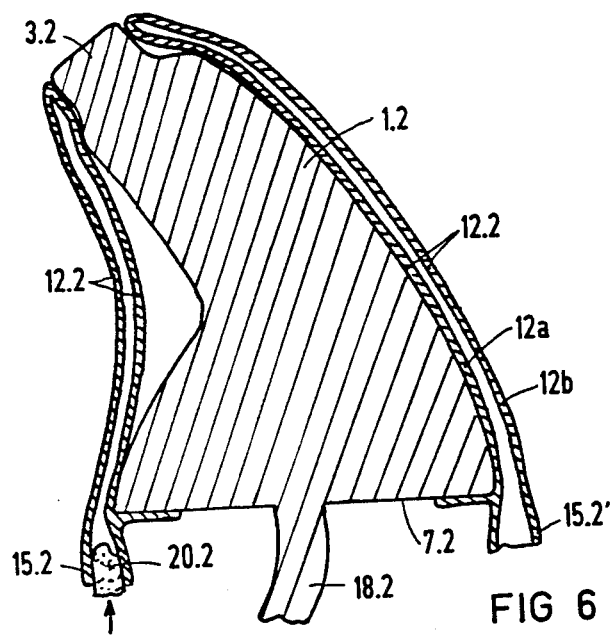
FIGS. 6 and 7 are cross-sectional longitudinal views of an apparatus having a double-wall envelope for the manufacture of an otoplastic according to a third alternative method of the present invention.

FIG. 1 shows a die 1 whose outside contour essentially simulates the basic shape of a human auditory canal. A channel 2 through which the otoplastic material is introduced during manufacture of the otoplastic proceeds longitudinally through the die 1. The channel 2 is lengthened somewhat by a hollow connector 3 at a proximal end of the die 1, i.e. at that end that projects farthest into the auditory canal of the ear during manufacture.

The die 1 is first plugged into an over-shell 4 that is likewise adapted to the basic shape of the human ear. Die 1 and over-shell 4 terminate flush at the distal end. The over-shell 4 has a hole 5 for the connector 3 at the proximal end.

After the die 1 is plugged in the over-shell 4 so that the connector 3 projects out of the over-shell 4, a resin compound 6 is pressed against the connector 3 so that the gap between connector 3 and over-shell 4 is sealed. Thus, the fluid otoplastic material cannot proceed between die 1 and over-shell 4 during manufacture of the otoplastic. Further, when the compound 6 gradually tapers to the tip of the connector 3 (see FIG. 2) the formation of air bubbles is prevented in depressions at this location.

In a further step, an aeration plate 8 is attached to the flat die face 7 at the distal end. The diameter of the plate 8 is at least as wide as the over-shell 4 at its widest location and seals the combination of die 1 and over-shell 4 at this end. The aeration plate 8 is preferably composed of two disks 8', 8'' that are arranged parallel to and at a distance from one another (interspace 9) and that are connected to one another via a connecting piece 8''' (see FIG. 2). The connecting piece 8''' has a smaller diameter than the disks 8' and 8''. A first bore 10 through the plate 8 is positioned such that it coincides with the channel 2 in the die 1 after assembly. A further bore 11 proceeds only through the disk 8' of the plate 8 and forms an aeration opening for the interspace 9 between the disks 8', 8''. Air displaced by the otoplastic material or excess otoplastic material can emerge through this opening 11 during manufacture of the otoplastic.

An elastic envelope 12 is then pulled over the device composed of die 1, over-shell 4 and aeration plate 8. This envelope 12 can, for example, be fabricated of a synthetic caoutchouc. Wall thicknesses of the envelope between 25 mm and 0.2 mm are especially suitable since the envelope should be extremely and easily stretchable without tearing. The opening 13 of the envelope 12 constricts somewhat after it is stretched over the device. The edge of the envelope 12 at the opening 13 is thus inverted over the end face of the disk 8' of the aeration plate 8 and thus the envelope 12 cannot detach itself from the apparatus composed of die 1, over-shell 4 and plate 8.

As a last step of assembly, a die holder 14 is screwed onto the distal side. The die holder 14 receives a hose 15 that is inserted through the bore 10 of the aeration plate 8 and into the introduction channel 2 of the die 1 during assembly. The hose 15 serves the purpose of introducing otoplastic material. Via the die holder 14, the aeration plate 8 is attached by screws 16 to the die 1. The envelope 12 has its inverted edge clamped between aeration plate 8 and die holder 14. The screws 16 fit into screw holes 17. The die holder 14 is also provided with a stem 18 that facilitates the positioning of the device in the auditory canal of the ear of the hearing-impaired person. After assembly, the opening 19 in the die holder 14 coincides with the bore 11 in the aeration plate 8. The opening 19 unctions as an outlet for the displaced air between over-shell 4 and envelope 12 in the manufacture of the otoplastic.

In a modification of this apparatus, the hose 15 could be rigidly attached at the injection side of the die holder 14 for the otoplastic material. The rigid hose part can then simultaneously serve as a positioning aid and the stem 18 would thereby be eliminated.

The component parts of the apparatus are all parts that are pre-fabricated in mass production. No part need be specially fabricated and they can all be universally utilized. Therefore, considerable costs are saved.

FIG. 2 shows a section through the apparatus of FIG. 1 in its assembled condition. The apparatus composed of parts 1–19 is introduced into the auditory canal of the ear of a hearing-impaired person to be fitted therewith and is positioned with the stem 18. Upon introduction of the apparatus into the ear, no otoplastic material is between over-shell 4 and envelope 12. Some air is merely enclosed therein. However, after the apparatus has been correctly positioned, fluid otoplastic material 20 is injected from the distal end of the hose 15, being injected, for example, with a syringe (not shown). As a result thereof, the remaining air between over-shell 4 and envelope 12 is slowly exhausted from the interspace 9 and the bore 11 of the aeration plate 8 and, finally, is exhausted through the aeration opening 19 of the die holder 14. The envelope 12 expands as more otoplastic material is injected until it contacts the walls of the auditory canal of the ear. In this way, the otoplastic assumes the shape of the auditory canal in an extremely exact fashion. The envelope 12 is completely filled with otoplastic material 20 as soon as the otoplastic material 20 emerges from the aeration opening 19. The delivery of the further otoplastic material 20 can then be ended.

The otoplastic material 20, for example an acrylic polymer, hardens or cures in a few minutes. The hardening or curing process can be accelerated by a photo initiator which can be added to the otoplastic material before the beginning of the manufacturing process. Such a photo initiator initiates the hardening or curing process when the material is exposed to light. In this case, die holder 14, aeration plate 8, over-shell 4 and die 1 can be preferably fabricated of transparent material. Plexiglass has proven advantageous as a material for the over-shell 4 and for the aeration plate 8 and polyoxymethylene is especially well-suited for the die holder 14. After the otoplastic material has hardened or cured, the apparatus is removed from the auditory canal and may be subjected to a further hardening or curing process. The screws 16 are then unscrewed and the die holder 14 together with hose 15 is removed. Aeration plate 8 and die 1 are also removed from the otoplastic. The proximal connector is then cut off in order to open up the sound-diverting opening 21. The necessary electrical and electromechanical component parts can then be built into the otoplastic in order to fabricate either an in-the-ear or a behind-the-ear hearing aid.

FIGS. 3 through 5 show a modification of the method set forth above. What is especially advantageous in this alternative embodiment is the conveying of the otoplastic material through openings in the over-shell that are perpendicular to the wall of the auditory canal. In particular, the envelope filled with otoplastic material adapts better to those auditory canal passages that have under-cuts.

FIG. 3 shows an exploded view of an apparatus for the implementation of this modification of the method. In contrast to the first exemplary embodiment, an over-shell 4.1 has a plurality of holes 22. The over-shell 4.1 can be provided with an arbitrary plurality of holes 22. The shape and size of the individual holes 22 can also be arbitrarily selected as long as the otoplastic material 20.1 can be pressed through the holes 22. What is most practical, however, is an over-shell 4.1 that enables an easy and uniform conveying of the otoplastic material. In an extreme case, the over-shell could be fashioned sieve-like.

A second envelope 23 is also used in this method in addition to a first envelope 12.1. First, the first envelope 12.1 is drawn over the over-shell 4.1 and the second envelope 23 is drawn over the die 1.1. Subsequent thereto, otoplastic material 20.1 is uniformly distributed in the over-shell 4.1, potentially by means of an introduction channel 2.1 (which can also be the opening of the envelope 12.1). Die 1.1 together with envelope 23 are then likewise positioned in the over-shell 4.1. The die 1.1 is smaller than the die 1 used in the preceding exemplary embodiment. Therefore, the otoplastic material 20.1 is hardly displaced through the holes 22 when the die 1.1 is inserted (see FIG. 4).

As a last step in assembly, a retaining plate 24 for holding the apparatus at the over-shell 4.1 is secured, for example with adhesive. The open end of the envelope 23 is previously drawn through an opening 25 in the retaining plate 24. A stem 18.1 at the retaining plate 24 facilitates the positioning of the apparatus in the ear of the hearing-impaired person.

FIG. 4 shows a section through the FIG. 3 apparatus in its assembled condition. Corresponding to the first exemplary embodiment, the apparatus is introduced into the auditory canal of the ear of a hearing-impaired person to be fitted therewith and is positioned with the stem 18.1. At this point in time, the otoplastic material 20.1 is still situated in a first region between over-shell 4.1 and envelope 23. Next the envelope 23 is inflated, and as a result the otoplastic material 20.1 is forced out of the first region. The otoplastic material 20.1 is forced into a second region between the envelope 12.1 and the over-shell 4.1 by flowing out through the holes 22 of the over-shell 4.1. The envelope 23 is inflated via its opening 26. A filling agent, for example air, is used for inflating the envelope 23. The introduction of the filling agent is indicated with the arrow 27 in FIG. 5. The envelope 23 displaces the otoplastic material 20.1 until the envelope 12.1 has adapted to the shape of the auditory canal of the hearing-impaired person and the interspace between the over-shell 4.1 and the envelope 12.1 is completely filled with otoplastic material 20.1. The pressure on the otoplastic material 20.1 produced by the envelope 23 is retained until the otoplastic material 20.1 has hardened or cured. After the otoplastic material has hardened or cured, the apparatus is removed from the ear of the hearing-impaired person. The retaining plate 24 is separated from the apparatus so that the die 1.1 and the envelope 23 can be removed from the over-shell 4.1. In case otoplastic material 20.1 is still situated in the first region, this is separated out of the over-shell 4.1.

Figure 7:
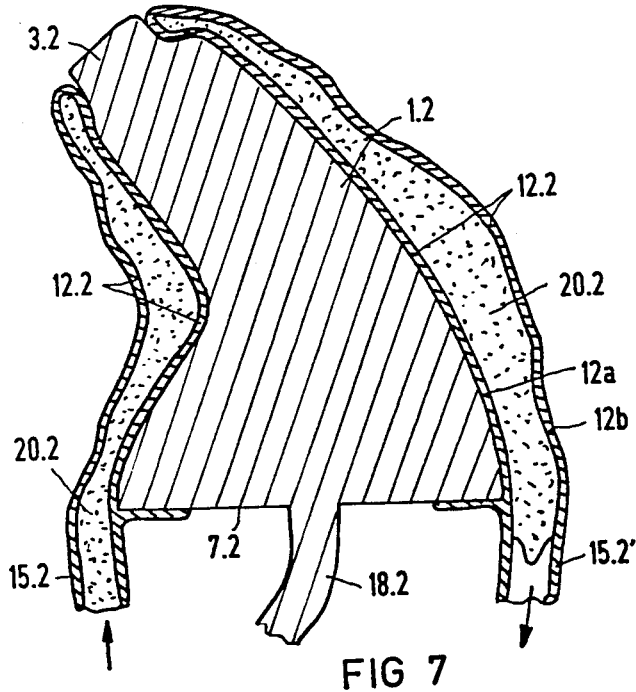

FIGS. 6 and 7 show a third alternative embodiment. An over-shell as well as a retaining plate are eliminated in this embodiment. Instead, the elastic envelope is fashioned with a double-wall so that the otoplastic material can be introduced between the two layers of the envelope. The manufacture of such envelopes can be implemented in accordance with the manufacturing method of double-wall gloves. Such a method is set forth, for example, in German published application 32 06 402.

FIG. 6 shows a section through an apparatus constructed in accordance with the third exemplary embodiment. Die 1.2 has a connector 3.2 and a stem 18.2 and is surrounded by an elastic, double-wall envelope 12.2. This envelope 12.2 fits around the connector 3.2 at the proximal end of the die 1.2 and fits over the flat die face 7.2 at the distal end. Two hoses 15.2 and 15.2' fashioned as part of the envelope 12.2 are also situated at the distal end of the die 1.2. The hose 15.2 is the admission hose for the otoplastic material 20.2. The hose 15.2' is the discharge hose for the otoplastic material 20.2.

An arrangement having exactly two hoses, however, is not absolutely necessary. If desired, more admission and discharge hoses can be provided. Also, it is possible to fashion the envelope 12.2 with only one hose. In this case, the envelope should be evacuated before the otoplastic material is supplied, this eliminates the necessity of a discharge hose. The die 1.2 can also be replaced by a shell.

In an advantageous embodiment, the envelope 12.2 has different wall thicknesses. An inside layer 12a and the hoses 15.2, 15.2' have a greater wall thickness than an outside layer 12b that is about 0.1 mm thick. The hoses 15.2 and 15.2' are thickened so that they do not stretch when otoplastic material 20.2 is injected. A wall thickness of 0.3 mm through 0.5 mm can be formed, for example, by repeated re-dipping of the hoses during the manufacture of the envelope 12.2. A slight thickening of the inside layer 12a of the envelope 12.2 produces a small aeration gap in the finished otoplastic after the integration of the hearing aid module (not shown).

FIG. 7 shows the apparatus after the otoplastic material 20.2 has been introduced between the walls 12a and 12b of the envelope 12.2. The outside layer 12b of the envelope is adapted to the shape of the auditory canal of the hearing-impaired person. The inside layer 12a of the envelope has been forced against the die 1.2. After the interspace between the walls 12a and 12b of the envelope 12.2 is completely filled with otoplastic material 20.2, the excess otoplastic material 20.2 is forced into the discharge hose 15.2'. After the hardening or curing of the otoplastic material 20.2 in the auditory canal, the apparatus is removed from the ear. The after-working of this otoplastic is especially simple. After the removal of the die 1.2, the envelope 12.2 is merely removed from the hard otoplastic material 20.2 and the distal end of the otoplastic is ground smooth. A sound exit at the proximal end of the otoplastic need not be bored since the connector 3.2 has already created an appropriate opening during the manufacture of the otoplastic.

FIGS. 8 and 9 show another especially advantageous apparatus for the implementation of the method of the invention. FIG. 8 shows an exploded view of the individual components of this apparatus. A shell 4.3 has essentially the basic shape of a human auditory canal and its inside contour simulates the outside contour of an in-the-ear hearing aid module. At its proximal end, the shell 4.3 surrounds an opening into which a bored connector 3.3 fits with some play. A cover plate 28 having snap-in connectors 29 and a threaded hole 30 is provided as a cover for the over-shell 4.3 at the distal end.

An elastic envelope 12.3 having the same outside contour as the over-shell has on its distal end 7.3' a first, narrow, centered, tubular opening 13.3 and a hose set-off 15.3'. A clamp plate 31 having a bore 32 and a recess 33 is used for holding the envelope 12.3 during the manufacturing process. This is secured to the apparatus by means of a nut 34 that is screwed onto a bored screw 35. A hose 15.3 that is at least partially rigid proceeds through the bore hole of the bored screw 35. The hose 15.3 whose admission channel 2.3 conducts the otoplastic material 20.3 into the apparatus has its proximal end secured to the overshell 4.3 and to the bored connector 3.3.

As a first step in assembling the apparatus, the bored connector 3.3 is secured to the over-shell 4.3. The hose 15.3 is then plugged onto the connector 3.3 and is secured so that the otoplastic material 20.3 is conducted through the shell 4.3 and through the bored connector 3.3 during the manufacturing process of the otoplastic. The opposite, distal end of the hose 15.3 is inserted through the threaded hole 30 of the cover plate 28 and the cover plate 28 is connected to the distal end 7.3 of the shell 4.3. Plug connectors 29 on the cover plate 28 and the shell 4.3 are provided for the purpose of detachably joining these two components. The connection, however, could also be fashioned as a glued connection or as a rated break point. As a next step, the bored screw 35 is threaded over the hose 15.3 and is screwed into the thread 30 of the cover plate 28. A resin compound 6.3 is pressed into the gap between connector 3.3 and shell 4.3 for sealing the proximal end of the over-shell 4.3 if necessary.

The apparatus composed of envelope 4.3, connector 3.3, cover plate 28, hose 15.3 and screw 35 must be placed into the envelope 12.3 as a next step. Since the opening 13.3 of the envelope 12.3 is far smaller than the apparatus, a 3-arbor tongs (not shown) is used to stretch the opening 13.3. After the apparatus has been positioned in the envelope 12.3, the 3-arbor tongs is removed. The envelope 12.3 is elastically fitted against the shell 4.3. The distal end 7.3' of the envelope 12.3 is clamped between a clamp plate 31 and the cover plate 28 so that the envelope 12.3 does not distort during manufacture of the otoplastic. An opening 32 in the clamp plate 31 through which the hose 15.3 is guided likewise has a somewhat larger diameter than the bored screw 35. If the tubular opening 13.3 of the elastic envelope 12.3 projects out through the opening 32 of the clamp plate 31, it is cut off such that it ends with the distal face of the clamp plate 31. A nut 34 is screwed onto the end of the bored screw 35 projecting distally from the apparatus in order to hold the clamp plate 31.

Since the hose 15.3 is preferably fashioned rigid at least in its distal region, it can be used for positioning the apparatus in the auditory canal of the hearing-impaired person. After positioning, the otoplastic material 20.3 is injected into the apparatus via the hose 15.3, as already set forth with reference to the first exemplary embodiment. After the envelope 12.3 has adapted to the shape of the auditory canal and the interspace between shell 4.3 and envelope 12.3 has been completely filled with otoplastic material 20.3, the excess otoplastic material emerges from the aeration hose 15.3' of the envelope 12.3.

After the otoplastic material 20.3 has hardened or cured, the apparatus is again taken apart and the envelope 12.3 is pulled off of the otoplastic material 20.3. Either an in-the-ear hearing aid module or a plug-in module for a behind-the-ear hearing aid can be built into the shell 4.3 of the finished otoplastic.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for manufacturing an otoplastic using a die and a flowing otoplastic material comprising the steps of:
    (a) drawing a deformable envelope onto the die that simulates the outside contour of an in-the-ear hearing aid module;
    (b) introducing and positioning an apparatus composed of the die and the envelope into the auditory canal of the ear of a hearing impaired person to be fitted therewith;

(c) injecting the otoplastic material into the apparatus between the die and the envelope via an admission channel until the envelope has adapted to the shape of the auditory canal of the ear and until an interspace between the die and the envelope is completely filled with otoplastic material;

(d) after hardening of the otoplastic material, removing the apparatus from the ear of the person; and (e) removing the die from the withdrawn apparatus.

2. The method according to claim 1, wherein the flowing otoplastic material is introduced through an admission channel in the die.

3. The method according to claim 1, wherein an over-shell is positioned over the die and the envelope, is pulled over the over-shell and wherein the interspace, including a space between the envelope and the over-shell is filled with the flowing otoplastic material via the admission channel.

4. The method according to claim 1, wherein a die holder is connected to the die at a distal end of the die facing away from the ear during method step (a), said die holder connecting the envelope to the die.

5. The method according to claim 3, wherein a die holder is connected to the die at a distal end of the die facing away from the ear during method step (a) and the die holder connecting the die to the over-shell.

6. The method according to claim 1, wherein an over-shell provided with holes is positioned over the die and the envelope is pulled over the over-shell and wherein the interspace, including a space between the die and the over-shell is filled with the flowing otoplastic material first via the admission channel and wherein the otoplastic material is subsequently displaced through the holes of the over-shell into a space between the over-shell and the envelope.

7. A method for the manufacture of an otoplastic using a die and a flowing otoplastic material, comprising the steps of:

(a) drawing a deformable, double-wall envelope onto the die which simulates the outside contour of an in-the-ear hearing aid module;

(b) introducing and positioning an apparatus composed of the die and the envelope into the auditory canal of the ear of a hearing impaired person to be fitted therewith;

(c) injecting flowing otoplastic material into the apparatus between inner and outer walls of the envelope until the outer wall of the envelope has adapted to the shape of the auditory canal of the ear, and until the inner wall of the envelope has placed itself against the die and until an interspace between the walls of the envelope is completely filled with otoplastic material;

(d) after hardening of the otoplastic material, removing the apparatus from the ear of the patient; and (e) removing the die from the withdrawn apparatus.

8. The method according to claim 7, wherein the envelope has two hoses fashioned as part of the envelope; and wherein the otoplastic material is introduced through one hose and emerges through the other hose.

9. The method according to claim 7, wherein air is eliminated from the envelope before the otoplastic material is introduced.

10. A method for manufacturing an otoplastic using a shell and a flowing otoplastic material comprising the steps of:

(a) pulling a deformable envelope onto the shell which simulates the outside contour of an in-the-ear hearing aid modual;

(b) introducing and positioning an apparatus composed of the shell and the envelope into the auditory canal of the ear of a hearing-impaired person to be fitted therewith;

(c) introducing the flowing otoplastic material into the apparatus between the shell and the envelope via an admission channel until the envelope has adapted to the shape of the auditory canal of the ear and until an interspace between the shell and the envelope is completely filled with otoplastic material; and (d) after hardening of the otoplastic material, removing the apparatus from the ear of the patient.

11. The method according to claim 10, wherein the admission channel is fashioned as a hose that proceeds through the shell and that is connected to the shell; and wherein that the flowing otoplastic material is supplied via the hose to a space to be filled under the envelope.

* * * * *